US008166060B2

(12) United States Patent
Kawauchi

(10) Patent No.: US 8,166,060 B2
(45) Date of Patent: Apr. 24, 2012

(54) LOCATION SEARCH DEVICE, LOCATION SEARCH METHOD, AND COMPUTER-READABLE STORAGE MEDIUM STORING LOCATION SEARCH PROGRAM

(75) Inventor: Hiroshi Kawauchi, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 177 days.

(21) Appl. No.: 12/792,126

(22) Filed: Jun. 2, 2010

(65) Prior Publication Data
US 2010/0325104 A1 Dec. 23, 2010

(30) Foreign Application Priority Data

Jun. 22, 2009 (JP) ................ 2009-147161

(51) Int. Cl.
*G06F 17/30* (2006.01)
(52) U.S. Cl. ..................................... 707/767
(58) Field of Classification Search .......... 707/705–707, 707/713, 723, 748, 754, 758, 767, 804, 805; 701/400, 410, 425, 200
See application file for complete search history.

(56) References Cited

U.S. PATENT DOCUMENTS

| 7,769,757 | B2* | 8/2010 | Grefenstette et al. ......... 707/736 |
| 2005/0043949 | A1* | 2/2005 | Roth et al. .................... 704/251 |
| 2008/0115046 | A1* | 5/2008 | Yamaguchi ................... 715/201 |
| 2010/0114475 | A1* | 5/2010 | Shin et al. .................... 701/201 |

FOREIGN PATENT DOCUMENTS
JP     A 2007-206978     8/2007
* cited by examiner

*Primary Examiner* — Cam-Linh Nguyen
(74) *Attorney, Agent, or Firm* — Oliff & Berridge, PLC

(57) ABSTRACT

A location search device, in which when one of buttons in a character input portion is repeatedly pressed, a plurality of characters assigned in advance to the one button is displayed in an input character display portion in a predetermined cyclic sequence. When one of the buttons is pressed, and then, another of the buttons is pressed, the character displayed in the display portion immediately prior to pressing of the other button is set as an input set character. When the character is input through the character input portion following the input set character, a character string is input. A plurality of compound character strings are created by combining the input set character string with the plurality of characters that is pressed next, and search object character strings that partially match the respective compound character strings are acquired from a character string storage portion, as input candidate character strings.

16 Claims, 8 Drawing Sheets

| CANDIDATE CHARACTER STRING | CHARACTER STRING IDENTIFICATION CODES | PRIORITY |
|---|---|---|
| .... | .... | .... |
| AEJ | 0101,0202,0401 | 133 |
| AGFG | 0101,0301,0203,0301 | 175 |
| AGOW | 0101,0301,0503,0801 | 163 |
| AGQ | 0101,0301,0602 | 211 |
| AGQDA | 0101,0301,0602,0201,0101 | 185 |
| .... | .... | .... |
| TEASHOP | 0701,0202,0101,0604,0302,0503,0601 | 149 |
| TEPCE | 0701,0202,0601,0103,0202 | 219 |
| TEQUILA | 0701,0202,0602,0702,0303,0403,0101 | 188 |
| TEQVKY | 0701,0202,0602,0703,0402,0803 | 160 |
| TEQVLX | 0701,0202,0602,0703,0403,0802 | 180 |
| TESZMLK | 0701,0202,0604,0804,0501,0403,0402 | 208 |
| TESZVQF | 0701,0202,0604,0804,0703,0602,0203 | 253 |
| TEXAS | 0701,0202,0802,0101,0604 | 142 |
| .... | .... | .... |

| BUTTON NUMBER | CHARACTERS | NUMBER OF TIMES PRESSED | DISPLAYED CHARACTER |
|---|---|---|---|
| 01 | ABC | 01 | A |
| | | 02 | B |
| | | 03 | C |
| 02 | DEF | 01 | D |
| | | .... | |
| .... | | | |
| 08 | WXYZ | 01 | W |
| | | 02 | X |
| | | 03 | Y |
| | | 04 | Z |

| INPUT SET CHARACTER | INPUT CHARACTER | CANDIDATES FOR OUTPUT |
|---|---|---|
| TE | P | TEPCE,TEQUILA,TEQVLX,···· |
| TE | Q | TEQUILA,TEQVLX,TEQVKY,···· |
| TE | R | TESZVQF,TESZMLK,TEPCE,···· |
| TE | S | TESZVQF,TESZMLK,TEPCE,···· |

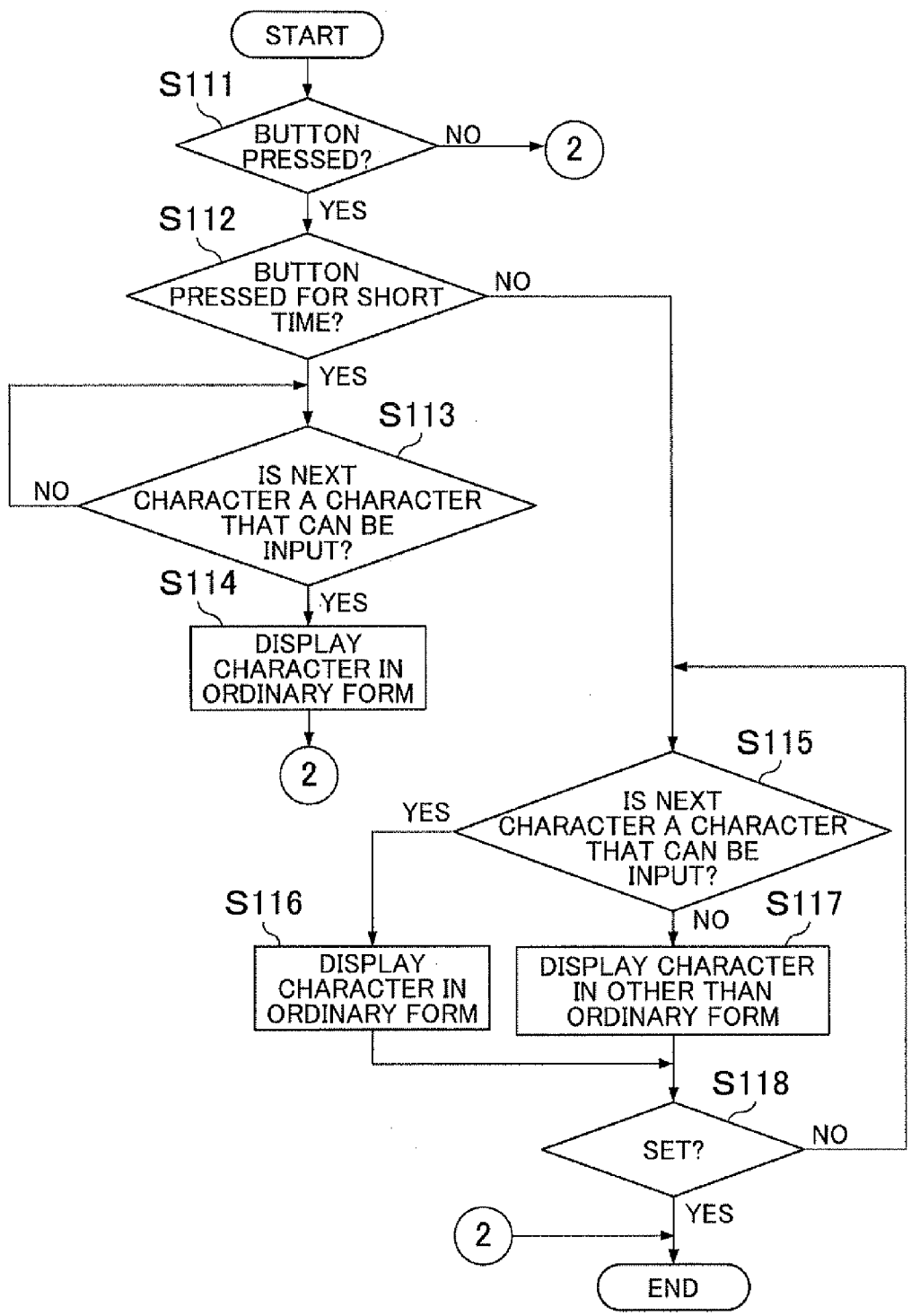

BUTTON PRESSED FOR SHORT TIME

BUTTON PRESSED FOR LONG TIME

| INPUT SET CHARACTER | INPUT CHARACTER | CANDIDATES FOR OUTPUT |
|---|---|---|
| TE | P | TESZVQF,TEPCE,TEQUILA,···· |
| TE | Q | TESZVQF,TEQUILA,TEQVLX,···· |
| TE | R | TESZVQF,TESZMLK,TEPCE,···· |
| TE | S | TESZVQF,TESZMLK,TEPCE,···· |

LOCATION SEARCH DEVICE, LOCATION SEARCH METHOD, AND COMPUTER-READABLE STORAGE MEDIUM STORING LOCATION SEARCH PROGRAM

INCORPORATION BY REFERENCE

The disclosure of Japanese Patent Application No. 2009-147161 filed on Jun. 22, 2009 including the specification, drawings and abstract is incorporated herein by reference in its entirety.

BACKGROUND OF THE INVENTION

1. Field of the Invention

The present invention relates to a location search device, a location search method, and a computer-readable storage medium that stores a location search program that have a limited number of buttons for inputting characters.

2. Description of the Related Art

Various types of technologies have been proposed for inputting a character string efficiently using a limited number of buttons in a case where the number of buttons for inputting characters is limited. For example, in Japanese Patent Application Publication No. 2007-206978 (JP-A-2007-206978), twelve keys are arranged in four rows of three keys each in a key portion 4 of a mobile telephone terminal. In addition, a text input area 32 and a candidate list area 33 are displayed on a screen of the mobile telephone terminal, with a text of an e-mail message being displayed in the text input area 32 and a list of predicted candidates being displayed in the candidate list area 33 in an arrangement that corresponds to the key arrangement (four rows of three keys each) in the key portion 4. Further, in a case where one of the keys that are disposed in the key portion 4 is pressed for less than a fixed time (that is, in a case where the key is pressed for a short time), the mobile telephone terminal displays, as input characters in the text input area 32, characters that are assigned to the pressed key. On the other hand, in a case where one of the keys that are disposed in the key portion 4 is pressed for at least the fixed time (that is, in a case where the key is pressed for a long time), the mobile telephone terminal displays, in the text input area 32, the predicted candidate that, of the predicted candidates that are displayed in the candidate list area 33, is in a display position that corresponds to the position of the key in the key portion 4 that is pressed for a long time. (For example, described in JP-A-2007-206978 (paragraphs 0017 to 0061)).

SUMMARY OF THE INVENTION

The mobile telephone terminal that is described in No. JP-A-2007-206978 is provided with a function that displays the list of the predicted candidates, but the function displays only the predicted candidates that begin with a character string that matches the characters that have been input through the key portion 4 up to this point. Therefore, in a case where the last character that was input is the kana "ko", for example, that is, a character that begins with the consonant "k", a user, in using a ten-key pad to input the kana character, must press a key for the characters that begin with the consonant "k" five times, each time for a short time, in order to display the predicted candidates that match the input up to the character "ko". The usability is thus poor.

The present invention provides a location search device, a location search method, and a computer-readable storage medium that stores a location search program that are capable of simultaneously displaying candidate location names that begin with a character string that matches a character string that is configured from other characters that can be input from the button that is pressed.

A first aspect of the invention relates to a location search device that includes: a character string storage portion that stores a plurality of search object character strings; a character input portion that includes a plurality of buttons; an input character display portion in which a character input through the character input portion is displayed, wherein when one of the plurality of buttons is repeatedly pressed or pressed continuously for a given time or longer, a plurality of characters assigned in advance to the one button is displayed in the input character display portion in a predetermined cyclic sequence; when one of the plurality of buttons is pressed, and then, another of the plurality of buttons is pressed, the character displayed in the input character display portion immediately prior to pressing of the other button is set as an input set character whose input has been set; and when the character is input through the character input portion following the input set character, a character string is input; an input candidate character string acquisition portion that acquires the search object character string that partially matches the character string input through the character input portion, as an input candidate character string, from the character string storage portion; and an input candidate character string display portion in which the input candidate character string acquired by the input candidate character string acquisition portion is assigned to a character string button through which the input candidate character string is input, and the input candidate character string assigned to the character string button is displayed. The input candidate character string acquisition portion creates a plurality of compound character strings by combining the input set character string whose input has been set through the character input portion with the plurality of characters assigned in advance to the button that is pressed next, and the input candidate character string acquisition portion acquires the search object character strings that partially match the respective compound character strings, as the input candidate character strings, from the character string storage portion.

A second aspect of the invention relates to a location search method that includes the steps of: performing a character input process, wherein when one of a plurality of buttons in a character input portion is repeatedly pressed or pressed continuously for a given time or longer, a plurality of characters assigned in advance to the one button is displayed in an input character display portion in a predetermined cyclic sequence; when one of the plurality of buttons is pressed, and then, another of the plurality of buttons is pressed, the character displayed in the input character display portion immediately prior to pressing of the other button is set as an input set character whose input has been set; and when the character is input through the character input portion following the input set character, a character string is input; acquiring a search object character string that partially matches the input character string, as an input candidate character string, from a character string storage portion that stores a plurality of search object character strings; and assigning the input candidate character string to a character string button through which the input candidate character string is input, and displaying the input candidate character string assigned to the character string button; and creating a plurality of compound character strings by combining the input set character string whose input has been set with the plurality of characters assigned in advance to the button that is pressed next, and acquiring the search object character strings that partially match the respective compound character strings, as the input candidate character strings.

A third aspect of the invention relates to a computer-readable medium that stores a computer-executable location search program that causes a computer to perform the location search method according to the third aspect of the invention.

According to the first to the third aspects of the present invention that are described above, the user can perform input by pressing one of the input candidate character strings whose first portions match the character string that is configured from another character that can be displayed by pressing the same button a specified number of times, without cyclically displaying the characters by pressing the same button an unspecified number of times.

A fourth aspect of the invention relates to a location search device that includes: a character string storage portion that stores a plurality of search object character strings; a character input portion that includes a plurality of buttons; an input character display portion in which a character input through the character input portion is displayed, wherein when one of the plurality of buttons is repeatedly pressed or pressed continuously for a given time or longer, a plurality of characters assigned in advance to the one button is displayed in the input character display portion in a predetermined cyclic sequence; when one of the plurality of buttons is pressed, and then, another of the plurality of buttons is pressed, the character displayed in the input character display portion immediately prior to pressing of the other button is set as an input set character whose input has been set; and when the character is input through the character input portion following the input set character, a character string is input; a time measurement portion that measures a pressed time during which the button in the character input portion is pressed; a character determination portion that determines whether at least one of the search object character strings stored in the character string storage portion partially matches the character string that includes the character to be displayed, when the button is pressed so that the plurality of characters assigned to the button is displayed in the predetermined cyclic sequence; and an input character display control portion, wherein if the character determination portion determines that at least one of the search object character strings stored in the character string storage portion partially matches the character string that includes the character to be displayed, the input character display control portion displays the character in an ordinary form in the input character display portion, and if the character determination portion determines that none of the search object character strings stored in the character string storage portion partially matches the character string that includes the character to be displayed, the input character display control portion changes a form in which the character is displayed, in accordance with the pressed time.

According to the fourth aspect of the present invention that is described above, by pressing a button for a short time, the user can efficiently input a character for which a search object character string exists. Furthermore, even if the button is one of pressed for a long time and pressed continuously, by looking at the characters that are cyclically displayed, the user can easily confirm whether or not a search object character string exists that partially matches the character string that includes the currently displayed character.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is a figure that shows an example of a candidate character string data file that is stored in a character string database according to the first embodiment of the present invention;

FIG. 3 is a diagram that shows an example of a button data file that is stored in the character string database;

FIG. 8 is a flowchart that shows display state change processing that changes a state of a display in an input character display portion according to whether an input key button is pressed for a short time or a long time, according to the first embodiment of the present invention;

DETAILED DESCRIPTION OF THE EMBODIMENTS

Figure 1:
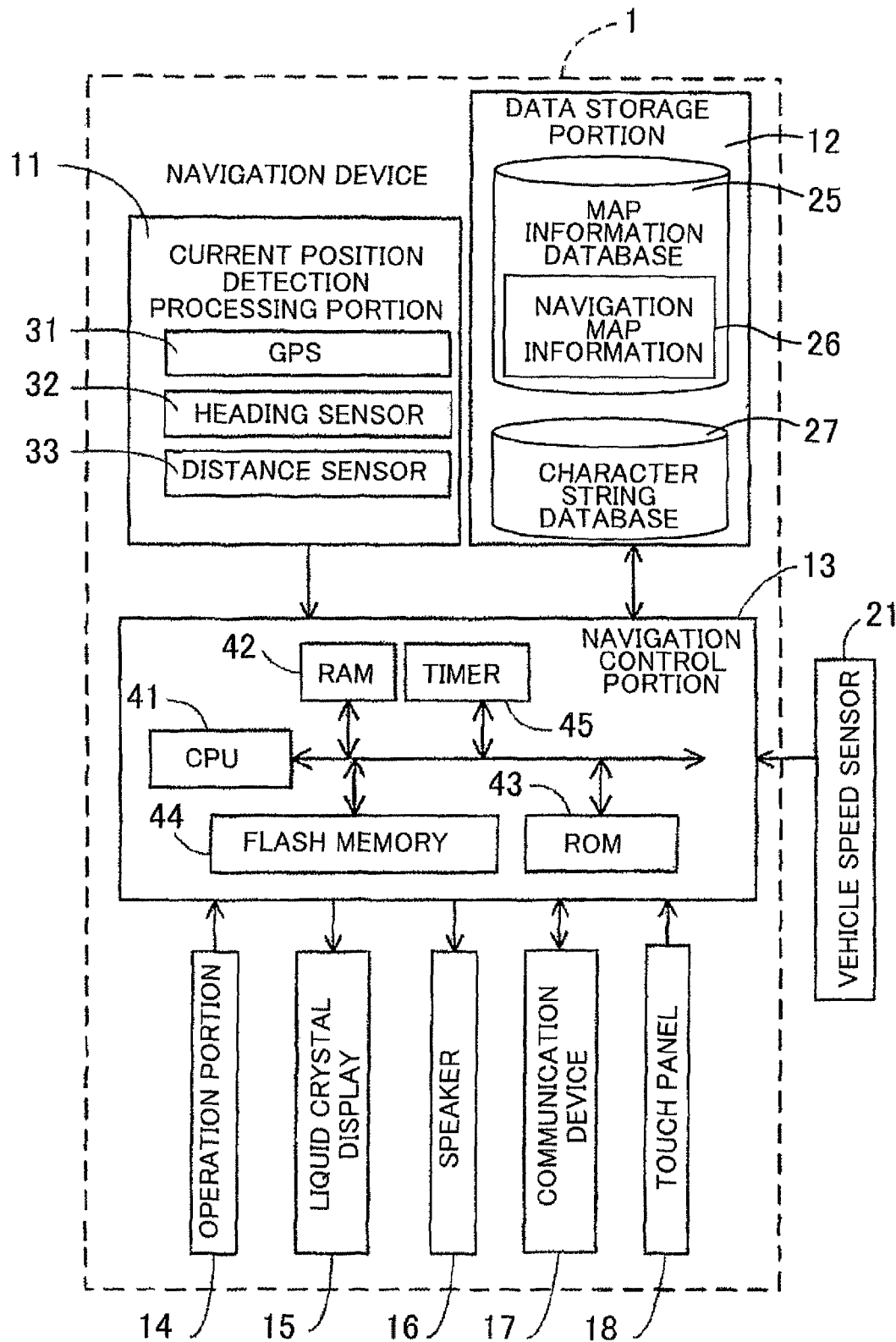
FIG. 1 is a block diagram that shows a navigation device according to a first embodiment of the present invention.

Hereinafter, an embodiment of the present invention will be explained in detail with reference to the drawings.
Overall Configuration of Navigation Device First, an overall configuration of a navigation device according to the present embodiment will be explained based on FIG. 1. As shown in FIG. 1, a navigation device 1 according to the present embodiment is configured from a current position detection processing portion 11, a data storage portion 12, a navigation control portion 13, an operation portion 14, a liquid crystal display 15, a speaker 16, a communication device 17, and a touch panel 18. The current position detection processing portion 11 detects a current position of a vehicle. The data storage portion 12 stores various types of data. The navigation control portion 13 performs various types of computational processing based on information that is input. The operation portion 14 accepts operations from an operator. The liquid crystal display 15 displays information such as a map and the like to the operator. The speaker 16 outputs voice guidance that pertains to route guidance and the like. The communication device 17 communicates, through a mobile telephone network or the like, with a road traffic information center, a map information distribution center, and the like, which are not shown in the drawings. The touch panel 18 is mounted on the surface of the liquid crystal display 15. In addition, a vehicle speed sensor 21 that detects the speed of the vehicle is connected to the navigation control portion 13.

Hereinafter, the various, structural elements that configure the navigation device 1 will be explained. The current position detection processing portion 11 is provided with a GPS 31, a heading sensor 32, a distance sensor 33, and the like, and it is capable of detecting the current position of the vehicle (hereinafter called the vehicle position), the vehicle direction, which indicate the direction the vehicle is facing, the distance the vehicle has traveled, and the like.

The data storage portion 12 is provided with a hard disk (not shown in the drawings) that serves as an external storage device and a storage medium, as well as with a read-write head (not shown in the drawings) for reading a map information database (a map information DB) 25 that is stored on the hard disk, a character string database (a character string DB) 27, a specified program, and the like and for writing specified data to the hard disk.

Further, navigation map information 26 that is used by the navigation device 1 for driving guidance and route searching is stored in the map information DB 25. In the present embodiment, the navigation map information 26 is configured from various types of information that are necessary for route guidance and map displaying. For example, the navigation map information 26 may be configured from newly built road information for specifying various newly built roads, map display data for displaying maps, intersection data that pertain to various intersections, node data that pertain to node points, link data that pertain to roads (links) that are a type of facility, search data for searching for a route, POI data that pertain to points of interest (POIs) such as shops and the like, which are a type of facility, data for searching for a location, and the like. The POI data include names, addresses, telephone numbers, and the like for POIs such as hotels, hospitals, gasoline stations, parking spaces, train stations, airports, ferry terminals, and the like in various regions, and they are stored together with IDs that specify the POIs.

The contents of the map information DB 25 are updated by downloading, through the communication device 17, update information that is distributed from the map information distribution center that is not shown in the drawings. The character string DB 27 contains a candidate character string file 51 (refer to FIG. 2) and a button data file 52 (refer to FIG. 3). The candidate character string file 51 stores, as candidate character strings, a plurality of character strings that indicate destinations and that will be described later. The button data file 52 stores button numbers of input keys 62 (refer to FIG. 6) to which alphabetic characters are assigned and also stores the numbers of times that each button is pressed to display a specific character. The input keys 62 will be described later.

As also shown in FIG. 1, the navigation control portion 13 that is a configuring element of the navigation device 1 is provided with a CPU 41, a RAM 42, a ROM 43, an internal storage device such as a flash memory 44 or the like, a timer 45, and the like. The CPU 41 serves as a computing device and a control device, and it performs control of the entire navigation device 1. The RAM 42 is used as a working memory when the CPU 41 performs various types of computational processing, and it also stores route data and the like when a search for a route is conducted. A control program is stored in the ROM 43. The internal storage device such as the flash memory 44 or the like stores a program that is read from the ROM 43. The timer 45 measures time.

The ROM 43 stores programs for various types of processing, including candidate character string display processing (refer to FIG. 4) that will be described later and that selects and displays a candidate character string in accordance with an input set character string whose input has been set and with the number of times that one of the input keys 62 has been pressed. The ROM 43 also stores a program for display state change processing (refer to FIG. 8) that changes a display state of an input character display portion 66 according to whether a button of the input keys 62 that will be described later is pressed for a short time or a long time, the short time being less than a specified time, and the long time being not less than the specified time. Furthermore, various peripheral devices (actuators), such as the operation portion 14, the liquid crystal display 15, the speaker 16, the communication device 17, and the touch panel 18 are electrically connected to the navigation control portion 13.

The operation portion 14 is operated when the current position is corrected when travel begins, when a departure point is input as a guidance starting point, when a destination is input as a guidance ending point, and when a search is conducted for information that pertains to a facility. The operation portion 14 is configured from various types of keys and a plurality of operation switches. The navigation control portion 13 also performs control of various types of operations that are performed based on switch signals that are output by the pressing and the like of the various switches, to which the various types of operations correspond.

The liquid crystal display 15 displays map information for the area where the vehicle is currently traveling, a search term input screen 61 (refer to FIG. 6), operation guidance, an operation menu, key guidance, a recommended route from the current position to the destination, guidance information along the recommended route, traffic information, news, weather forecasts, the time, e-mail, television programs, and the like.

Based on commands from the navigation control portion 13, the speaker 16 outputs, among other things, voice guidance that provides guidance to driving along the recommended route. In the present embodiment, the voice guidance that is provided may be, for example, "Turn right at the XX intersection 200 meters ahead."

The communication device 17 performs communication with the map information distribution center using a mobile telephone network or the like. The communication device 17 performs transmission and receiving of the newest versions of map update information and the like to and from the map information distribution center. In addition to the information it receives from the map information distribution center, the communication device 17 receives traffic information that includes various types of information that are transmitted from the road traffic information center and the like, such as congestion information, the degree of crowding at a service area, and the like.

The touch panel 18 is a collection of touch switches that is mounted on the surface of the liquid crystal display 15, and it is configured such that various types of commands can be input by pressing one of a button and a map that are displayed on the screen of the liquid crystal display 15. Note that the touch panel 18 may also be configured in the form of liquid crystal light sensors or the like such that the screen of the liquid crystal display 15 is pressed directly.

Next, the candidate character string file 51, which is stored in the character string DB 27 and in which are stored, as the candidate character strings, the plurality of character strings that indicate destinations, will be explained based on FIG. 2. FIG. 2 is a figure that shows an example of the candidate character string data file 51 that is stored in the character string DB 27.

As shown in FIG. 2, the candidate character string file 51 includes candidate character strings, character string identification codes, and priority values. The candidate character strings indicate location names, genres, facility names, abbreviated facility names, keywords that indicate facilities, and the like, and they are stored in alphabetical order. Each of the character string identification codes includes an identification code for each of the characters in the corresponding candidate character string. Each of the character identification codes is made up of a two-digit button number and a two-digit number of times pressed. The two-digit button number corresponds to a button (a key) among the input keys 62 and is stored in the button data file 52, which will be described later. The two-digit number of times pressed corresponds to the number of times that the key in question is pressed to input the character. Each of the priority values is stored in correspondence to one of the candidate character strings, and a higher numerical value indicates a higher priority.

For example, the identification codes for the individual characters in the candidate character string "AEJ", that is, the identification code "0101" for the character "A", which is composed of the button number "01" and the number of times pressed "01"; the identification code "0202" for the character "E", which is composed of the button number "02" and the number of times pressed "02", the identification code "0401" for the character "J", which is composed of the button number "04" and the number of times pressed "01", are stored in the character string identification codes in the order in which the individual characters are input.

Next, the button data file 52 that is stored in the character string DB 27 and in which are stored the button numbers for the input keys 62 and the numbers of times that each button is pressed to display a specific character will be explained based on FIG. 3.

FIG. 3 is a diagram that shows an example of the button data file 52 that is stored in the character string DB 27.

As shown in FIG. 3, the button data file 52 includes the button numbers, the characters that are assigned to each of the buttons, the numbers of times each of the buttons is pressed, and the characters that are displayed when each of the buttons is pressed the specified numbers of times. The button numbers are two-digit button numbers that identify the individual buttons in the input keys 62. The two-digit button numbers "01" to "08" are respectively assigned to the buttons "ABC", "DEF", "GHI", "JKL", "MNO", "PARS", "TUV", and "WXYZ".

The characters that are assigned to the buttons are stored in the form of alphabetic characters. The numbers of times that the buttons are pressed are stored in the form of two-digit numbers from "01" to "04" that indicate the numbers of times that the buttons are pressed in order to select the alphabetic characters that are assigned to the buttons. The displayed characters are the characters that are displayed in the input character display portion 66 of the search term input screen 61 (refer to FIG. 6) when the respective buttons are pressed the specified numbers of times.

For example, "01" is stored as the button number for the button among the input keys 62 to which the characters "A", "B", and "C" are assigned. For this button, "01" is stored as the number of times that the button is pressed to display "A", "02" is stored as the number of times that the button is pressed to display "B", and so on. Therefore, the identification, code that corresponds to the character "A" in the candidate character strings in the candidate character string file 51 is "0101". Similarly, the identification code that corresponds to the character "B" in the candidate character strings is "0102".

Candidate Character String Display Processing

Figure 4:
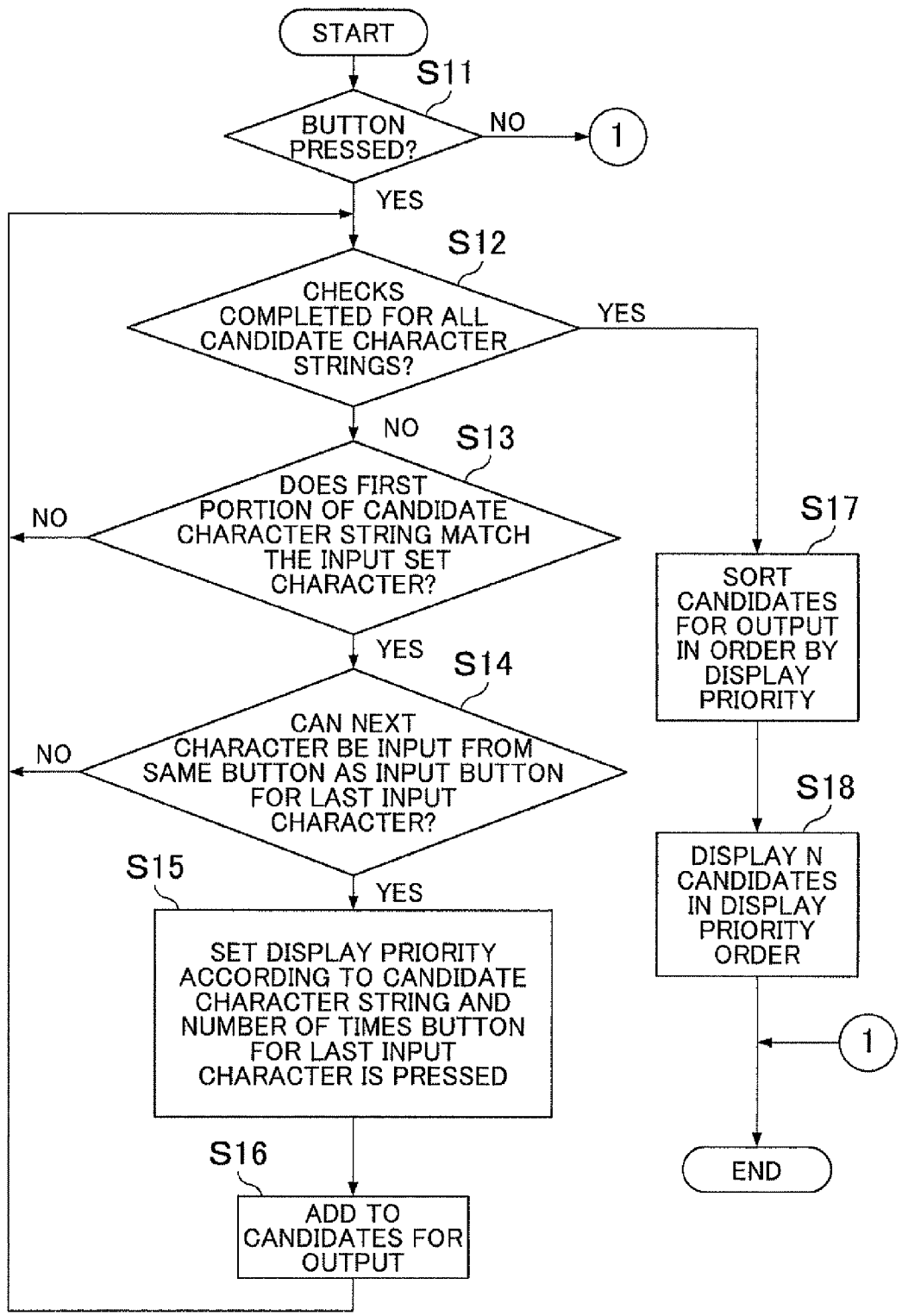
FIG. 4 is a flowchart that shows candidate character string display processing that displays a candidate character string that is selected in accordance with a character string whose input has been set and a number of times that an input key is pressed, according to the first embodiment of the present invention.

Next, the candidate character string display processing will be explained based on FIGS. 4 to 7. The candidate character string display processing, which is performed by the CPU 41 in the navigation device 1 that is configured as described above, selects and displays the candidate character strings in accordance with the input set character string whose input has been set and with the number of times that one of the input keys 62 has been pressed. FIG. 4 is a flowchart that shows the candidate character string display processing that is the processing that the CPU 41 performs and that displays the candidate character strings in accordance with the input set character string and with the number of times that one of the input keys 62 has been pressed.

Note that the program that is shown by the flowchart in FIG. 4 is executed by the CPU 41 at specified intervals (for example, every ten milliseconds) in a case where a destination setting button in the operation portion 14 that is not shown in the drawings is pressed. Furthermore, in a case where the destination setting button in the operation portion 14 that is not shown in the drawings is pressed, the CPU 41 displays, on the screen of the liquid crystal display 15, the search term input screen 61 (refer to FIG. 6) on which a search term is input as location information for searching for a name or the like that pertains to a facility.

As shown in FIG. 4, first, at step (hereinafter abbreviated as S) 11, the CPU 41 performs determination processing that determines whether or not one of the input keys 62 that are displayed on the search term input screen 61 and to which the alphabetic characters are assigned has been pressed. In a case where none of the buttons in the input keys 62 has been pressed (NO at S11), the CPU 41 terminates the processing.

Figures 5, 6:
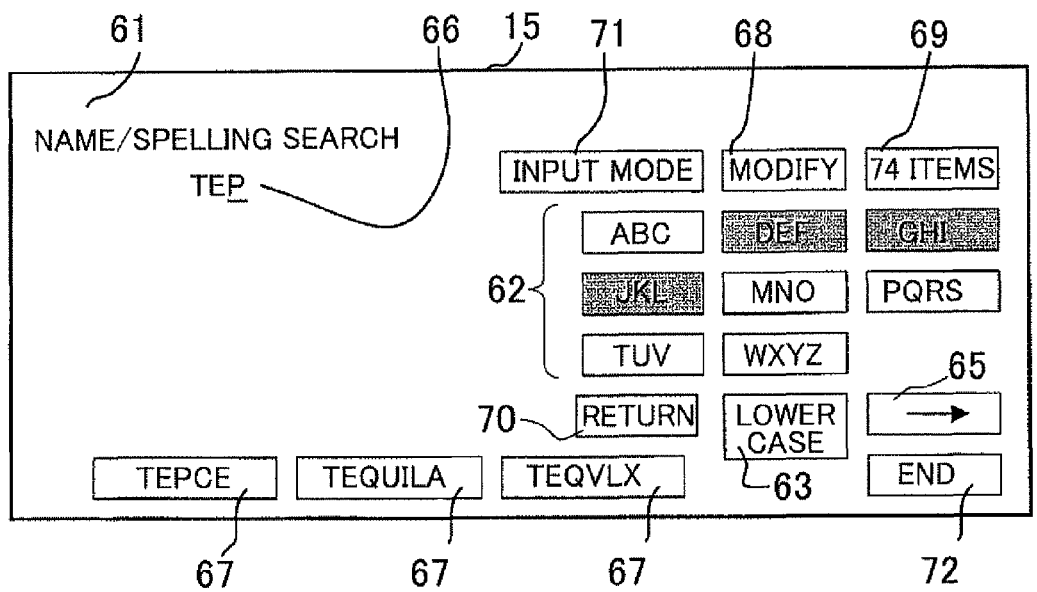
FIG. 5 is a figure that shows an example of candidates for output that are selected in a case where a "PQRS" button is pressed after the character string "TE" has been input, according to the first embodiment of the present invention.
FIG. 6 is a figure that shows an example in which a candidate character string that was selected by pressing the "PQRS" button once is displayed on a search term input screen, according to the first embodiment of the present invention.

Now an example of the search term input screen 61 will be explained based on FIG. 6. As shown in FIG. 6, the input keys 62, a lowercase conversion button 63, an input set button 65, the input character display portion 66, three candidate character string display portions 67, a modify button 68, a number of items display portion 69, a return button 70, an input mode display portion 71, and an end button 72 are displayed on the search term input screen 61.

The input keys 62 include eight buttons, to each of which a plurality of characters are assigned and each of which displays the characters that are assigned to it. For example, "ABC" is displayed on the button to which the characters "A", "B", and "C" are assigned. Alternatively, the button to which the characters "A", "B", and "C" are assigned may also display only the character "A". Furthermore, every time that one of the buttons in the input keys 62 is pressed, the characters that are assigned to the button are repeatedly displayed in the input character display portion 66, in order from the first character to the last character. When one of the buttons is pressed, and then, the other button or the input set button 65 is pressed, the character displayed immediately prior to pressing of the other button or the input set button 65 is displayed as the input set character whose input has been set. Thereafter, every time that the other button is pressed, the characters that are assigned to the other button can be displayed in order and can be input.

In addition, pressing the lowercase conversion button 63 causes the character that is being input and that is displayed in the input character display portion 66 to be converted into a lowercase character. Then pressing the input set button 65 or the other button among the input keys 62 causes the lowercase character to become the input set character whose input has been set.

The character that is being input and that is displayed in the input character display portion 66 can be set by pressing the input set button 65. Therefore, any one of the characters that are assigned to the same button, such as "A", "B", or the like, for example, can be input next by pressing the input set button 65.

In a case where at least one of the buttons in the input keys 62 has been pressed, three candidate character strings that partially match the characters that are displayed in the input character display portion 66 are displayed in the three candidate character string display portions 67. Pressing one of the candidate character string display portions 67 causes the candidate character string that is displayed in the candidate character string display portion 67 that is pressed to be displayed in the input character display portion 66 as the input set character string.

The last input character in the character string that is displayed in the input character display portion 66 can be deleted, one character at a time, by pressing the modify button 68. Furthermore, the state that existed prior to the most recent operation can be restored by pressing the return button 70. The number of the candidate locations that were found in accordance with the character string that is displayed in the input character display portion 66 are displayed in the number of items display portion 69.

A current input mode, such as alphabetic characters or the like, is displayed in the input mode display portion 71. Further, pressing the end button 72 causes a search to be conducted, using the character string that is displayed in the input character display portion 66 as the search term, for a name or the like that pertains to a facility and serves as location information, with a list of the search results being displayed.

On the other hand, as shown in FIG. 4, in a case where one of the input keys 62 has been pressed (YES at S11), the CPU 41 advances to the processing at S12. At S12, the CPU 41 makes a determination as to whether or not checks have been performed for all of the candidate character strings that are stored in the candidate character string file 51, that is, whether or not it is impossible to read the next candidate character string from among the candidate character strings that are stored in the candidate character string file 51. Note that at S12, the CPU 41 reads the candidate character strings that are stored in the candidate character string file 51 in order, starting with the first candidate character string.

In a case where the checks have not been performed for all of the candidate character strings that are stored in the candidate character string file 51, that is, where it is possible to read the next candidate character string from among the candidate character strings that are stored in the candidate character string file 51 (NO at S12), the CPU 41 reads the next candidate character string from among the candidate character strings that are stored in the candidate character string file 51, stores the candidate character string in the RAM 42, and advances to the processing at S13.

Next, at S13, the CPU 41 reads the next candidate character string from the RAM 42 and performs determination processing that determines whether or not the first portion of the candidate character string matches all but the last character of the input character string that is displayed in the input character display portion 66, that is, whether or not the first portion of the candidate character string matches the input set character string. In a case where it is determined that the first portion of the candidate character string that is read from the RAM 42 does not match the input set character string whose input has been set (NO at S13), the CPU 41 once again performs the processing that begins at S12.

On the other hand, in a case where it is determined that the first portion of the candidate character string that is read from the RAM 42 does match the input set character string whose input has been set (YES at S13), the CPU 41 advances to the processing at S14. At S14, the CPU 41 performs determination processing that determines whether or not the next character in the candidate character string that is read from the RAM 42 is a character that can be input using the button among the input keys 62 that was used to input the last input character that is displayed in the input character display portion 66, that is, whether or not the next character in the candidate character string is assigned to the same button as the last input character.

Specifically, the CPU 41 reads from the candidate character string file 51 the character string identification code that corresponds to the candidate character string that was read from the RAM 42, extracts the identification code for the next character in the first portion of the candidate character string, and stores the identification code in the RAM 42. The CPU 41 also reads from the button data file 52 the button number that corresponds to last input character that is displayed in the input character display portion 66. The CPU 41 then performs determination processing that determines whether or not the first two digits in the identification code for the next character in the first portion of the candidate character string match the button number that corresponds to last input character, that is, whether or not the button number is the same.

In a case where it is determined that the next character in the candidate character string, after the first portion that matches the input set character string, is not a character that can be input using the button among the input keys 62 that was used to input the last input character that is displayed in the input character display portion 66 (NO at S14), the CPU 41 once again performs the processing that begins at S12. Specifically, in a case where it is determined that the first two digits in the identification code for the next character after the matching first portion of the candidate character string do not match the button number that corresponds to last input character and that was read from the button data file 52 (NO at S14), the CPU 41 once again performs the processing that begins at S12.

On the other hand, in a case where it is determined that the next character in candidate character string, after the first portion that matches the input set character string, is a character that can be input using the button among the input keys 62 that was used to input the last input character that is displayed in the input character display portion 66 (YES at S14), the CPU 41 advances to the processing at S15. Specifically, in a case where it is determined that the first two, digits in the identification code for the next character after the matching first portion of the candidate character string do match the button number that corresponds to the last input character and that was read from the button data file 52 (YES at S14), the CPU 41 advances to the processing at S15.

At S15, the CPU 41 reads from the button data file 52 the number of times pressed that corresponds to the last input character that is displayed in the input character display portion 66. Then, based on the number of times pressed that corresponds to the last input character and based on the last two digits of the identification code for the next character after the matching first portion of the candidate character string, that is, the number of times pressed for the next character, the CPU 41 obtains the number of times that the button among the input keys 62 is required to be pressed to display the next character after the last input character.

Next, the CPU 41 reads the priority value for the candidate character string from the candidate character string file 51 and obtains a display priority value for the candidate character string in such a manner that the display priority value increases with decrease in the number of times that the button among the input keys 62 is required to be pressed to display the next character after the last input character.

For example, in a case where, in order to display the next character in the candidate character string, after the first portion that matches the input set character string and after the last input character, the number of times that the button among the input keys 62 is required to be pressed is zero, that is, in a case where the number of times that the button is required to be pressed is the same as for the last input character, the display priority value is obtained by adding "8000" to the priority value for the candidate character string. In cases where the button among the input keys 62 is required to be pressed one, two, and three times to display the next character after the last input character, the display priority values are respectively obtained by adding "4000", "2000", and "zero" to the priority value for the candidate character string.

Next, at S16, the CPU 41 stores the candidate character string, which is treated as a candidate for output that will be displayed in one of the candidate character string display portions 67 on the search term input screen 61, in the RAM 42 in association with the display priority value. Then the CPU 41 once again performs the processing that begins at S12.

On the other hand, in a case where, at S12, the checks have been performed for all of the candidate character strings that are stored in the candidate character string file 51, that is, where it is impossible to read the next candidate character string from among the candidate character strings that are stored in the candidate character string file 51 (YES at S12), the CPU 41 advances to the processing at S17. At S17, the CPU 41 reads from the RAM 42 the candidate character strings that were stored in the RAM 42 as the candidates for output, also reading the display priority values that are associated with the candidate character strings, then sorts the candidate character strings in descending order of priority, that is, starting with the candidate character string that has the highest display priority value.

Next, at S18, the CPU 41 selects a predetermined number N (for example, three) of the candidate character strings that have been sorted in descending display priority order, that is, in order starting with the highest display priority value, and displays the selected candidate character strings in the candidate character string display portions 67 on the search term input screen 61. The CPU 41 then terminates the processing.

Next, based on FIGS. 5 to 7, an example of the candidate character strings that are displayed in the candidate character string display portions 67 on the search term input screen 61 will be explained, using a case in which the input set character string displayed in the input character display portion 66 on the search term input screen 61 is "TE", and the last input character is one of "P", "Q", "R", and "S", that is, the "PQRS" button in the input keys 62 has been pressed. Note that the display priority value for each of the candidate character strings is obtained by adding one of "8000", "4000", "2000", and "zero" to the priority value for the candidate character string, according to whether the number of times that the "PQRS" button is required to be pressed to display the next character in the candidate character string, after the first portion that matches the input set character string and after the last input character, is zero times, one time, two times, or three times, respectively.

For example, in a case where the input character "P" is input by pressing the "PQRS" button in the input keys 62 one time, as shown in the first row in FIG. 5, the CPU reads "TEPCE", "TEQUILA", "TEQVKY", "TEQVLX", "TESZMLK", and "TESZVQF" in that order as the candidate character strings from the candidate character string file 51. The display priority values for those candidate character strings are "8219", "4188", "4160", "4180", "208", and "253", respectively. The CPU 41 sorts the candidate character strings in descending order by the display priority values, that is, "TEPCE", "TEQUILA", "TEQVLX", and so on, then stores them in the RAM 42 as the candidates for output.

Next, as shown in FIG. 6, the CPU 41 displays "TEP" in the input character display portion 66 on the search term input screen 61 and also selects "TEPCE", "TEQUILA", and "TEQVLX", the three candidate character strings with the highest display priority values, and displays them in the candidate character string display portions 67.

Furthermore, in a case where the input character "S", for example, is input by pressing the "PQRS" button in the input keys 62 four times, as shown in the fourth row in FIG. 5, the CPU 41 reads "TEPCE", "TEQUILA", "TEQVKY", "TEQVLX", "TESZMLK", and "TESZVQF" in that order as the candidate character strings from the candidate character string file 51. The display priority values for those candidate character strings are "4219", "2188", "2160", "2180", "8208", and "8253", respectively. The CPU 41 sorts the candidate character strings in descending order by the display priority values, that is, "TESZVQF", "TESZMLK", "TEPCE", and so on, then stores them in the RAM 42 as the candidates for output.

Figure 7:
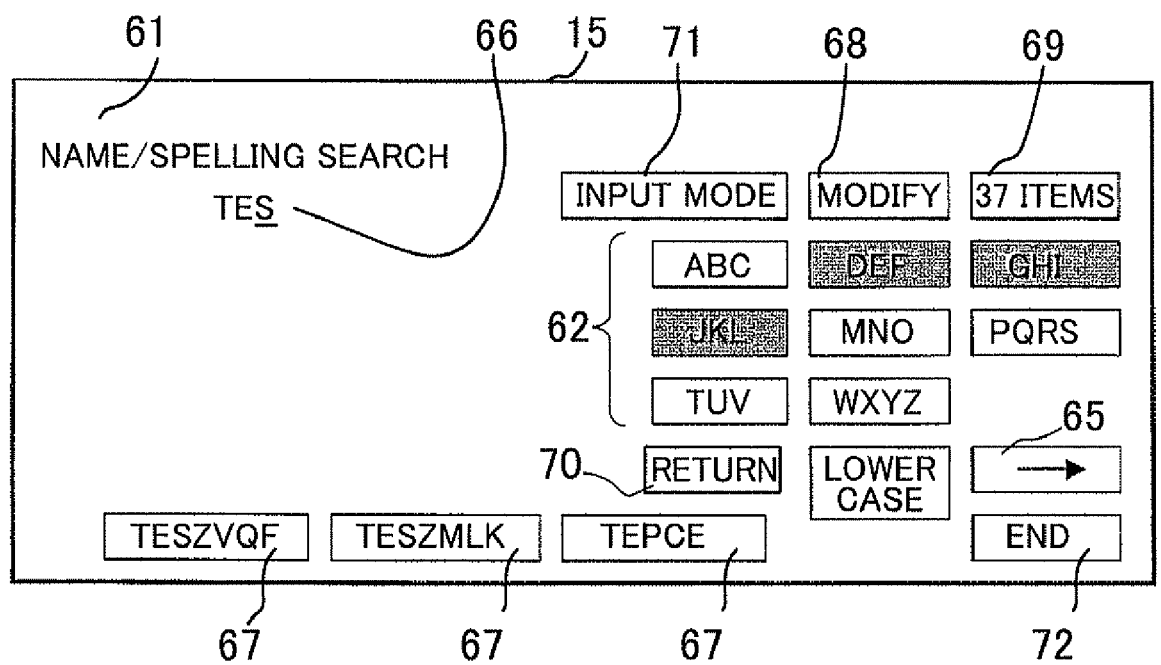
FIG. 7 is a figure that shows an example in which a candidate character string that was selected by pressing the "PQRS" button four times is displayed on the search term input screen, according to the first embodiment of the present invention.

Next, as shown in FIG. 7, the CPU 41 displays "TES" in the input character display portion 66 on the search term input screen 61 and also selects "TESZVQF", "TESZMLK", and "TEPCE", the three candidate character strings with the highest display priority values, and displays them in the candidate character string display portions 67.

Furthermore, as shown in FIGS. 6 and 7, in a case where, among the candidate character strings whose first portions match the input set character string "TE", the next character after the matching first portion in each of the candidate character strings cannot be input by a specific button, that is, where the specific button does not include the next character, the CPU 41 displays the button in a state that is toned down from the ordinary display state, such as by displaying the button itself or the characters within the button in gray or the like, or by making the button or the characters more transparent. For example, in a case where, among the candidate character strings whose first portions match the character string "TE", the next character after the matching first portion in each of the candidate character strings is a character that is not included in the "DEF" button, the "GHI" button, and the "JKL" button, the "DEF" button, the "GHI" button, and the "JKL" button are displayed in a state that is toned down from the ordinary display state, such as by displaying the buttons in gray or the like.

Display State Change Processing

In a mobile telephone terminal that is described in Japanese Patent Application Publication No. 2007-206978, input keys are used to input the syllables of the Japanese syllabary, so in a case where the last input character is the Japanese character "ko", for example, that is, where the character is in the set of characters in the Japanese syllabary that begin with the consonant "k", the input key for the characters that begin with "k" is required to be briefly pressed five times, which is cumbersome. In addition, as described previously, in a case where one of the input keys 62 has been pressed, it will sometimes happen that among the candidate character strings whose first portions match the input set character string, there is no character that can be input by pressing the button that includes the next character of the candidate character string after the matching first portion. It is conceivable that in a case where the characters to be input are sequentially displayed on the buttons in the input keys 62, this problem could be handled by displaying the characters that cannot be input in a toned down state by making the buttons gray or more transparent. Alternatively, the characters that cannot be input might not be displayed at all.

However, with a configuration in which the buttons in the input keys 62 are pressed, as in the present example, in a case where one of the buttons is pressed for a long time (details of which will be described later), if the display of the button in the input keys 62, for example the display of the "PQRS" button, is switched from "P" to "Q" to "S" to "P" to "Q" and so on, such that "R" is skipped, or if the "R" is toned down, it will be hidden by the user's finger and cannot be confirmed. Accordingly, based on FIGS. 8 to 10, a configuration will be explained that, in a case where one of the buttons in the input keys 62 is one of pressed for a long time and pressed continuously, that is, the one of the buttons is pressed for not less than a specified time, makes it easy to know that a character cannot be input through that button because there is no matching candidate character string.

The display state change processing that changes the state of the display in the input character display portion 66 (refer to FIG. 10) according to whether one of the buttons in the input keys 62 is pressed for the short time that is less than the specified time or for the long time that is not less than the specified time will be explained based on FIGS. 8 to 10. FIG. 8 is a flowchart that shows the display state change processing that changes the state of the display in the input character display portion 66 according to whether one of the buttons in the input keys 62 is pressed for the short time or the long time.

Note that the program that is shown by the flowchart in FIG. 8 is executed by the CPU 41 at specified intervals (for example, every ten milliseconds) in a case where a destination setting button in the operation portion 14 that is not shown in the drawings is pressed. Furthermore, in a case where the destination setting button in the operation portion 14 that is not shown in the drawings is pressed, the CPU 41 displays, on the screen of the liquid crystal display 15, the search term input screen 61 (refer to FIG. 10) on which a search term is input as location information for searching for a name or the like that pertains to a facility.

As shown in FIG. 8, first, at S111, the CPU 41 performs determination processing that determines whether or not one of the input keys 62 that are displayed on the search term input screen 61 and to which the alphabetic characters are assigned has been pressed. In a case where none of the buttons in the input keys 62 has been pressed (NO at S111), the CPU 41 terminates the processing.

On the other hand, in a case where one of the buttons in the input keys 62 has been pressed (YES at S111), the CPU 41 advances to the processing at S112. At S112, the CPU 41, using the timer 45, starts to measure the time that the button in the input keys 62 is pressed. Then the CPU 41 performs determination processing that determines whether the time that the button is pressed is the short time that is less than the specified time (for example, less than one second) or is the long time that is not less than the specified time (for example, less than one second), representing a continuous pressing of the button.

In a case where the button in the input keys 62 is pressed for the short time (YES at S112), the CPU 41 selects the next character from among the plurality of characters that are assigned to the button as the character to be displayed after the input set character string. The CPU 41 then advances to the processing at S113. Note that in the case where the button is pressed for the short time, every time that the button is pressed for the short time, the CPU 41 selects, as the character to be displayed after the input set character string, the next character among the characters that are assigned to the button, cycling through the characters in alphabetical order.

At S113, the CPU 41 performs determination processing that determines whether or not the next character that has been selected as the character to be displayed after the input set character string is a character that can be input as the character after the input set character string. In other words, the CPU 41 performs determination processing that determines whether or not a candidate character string is stored in the candidate character string file 51 whose first portion matches a character string that is formed by appending the selected next character to the input set character string.

In a case where it is determined that the next character that has been selected as the character to be displayed after the input set character string is a character that cannot be input as the character after the input set character string, that is, in a case where it is determined that a candidate character string whose first portion matches the character string that is formed by appending the selected next character to the input set character string is not stored in the candidate character string file 51 (NO at S113), the CPU 41 does not display the selected character after the input set character string, but instead selects the next character after the selected character as the character to be displayed after the input set character string. Then the CPU 41 once again performs the processing at S113.

On the other hand, in a case where it is determined that the next character that has been selected as the character to be displayed after the input set character string is a character that can be input as the character after the input set character string, that is, in a case where it is determined that a candidate character string whose first portion matches the character string that is formed by appending the selected next character to the input set character string is stored in the candidate character string file 51 (YES at S113), the CPU 41 advances to the processing at S114.

At S114, the CPU 41 displays in ordinary form the character that has been selected as the character to be displayed after the input set character string. In other words, the CPU 41 displays the character as the last input character in the input character display portion 66 on the search term input screen 61, using the font and the color that are used for an ordinary display. The CPU 41 then terminates the processing.

Figure 9A:
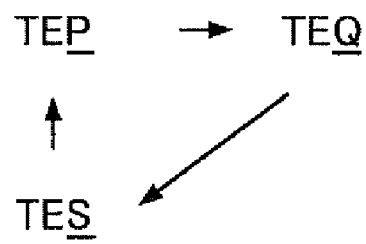
FIG. 9A and FIG. 9B are figures that show examples of the display state of the input character display portion when the "PQRS" button input key is pressed for a short time and a long time respectively, according to the first embodiment of the present invention.

Next, an example of a case in which the "PQRS" button is pressed for the short time while "TE" is being displayed in the input character display portion 66 as the input set character string will be explained based on the FIG. 9A. Note that a candidate character string whose first portion matches the character string "TER" is not stored in the candidate character string file 51. As shown in the FIG. 9A, in the case where the "PQRS" button is pressed for the short time, every time that the "PQRS" button is pressed for the short time, the CPU 41 cycles through the characters that can follow "TE", the input set character string, from "P" to "Q" to "S" to "P" to "Q" and so on, such that "R" is skipped.

On the other hand, at S112, as shown in FIG. 8, in a case where the time that the button in the input keys 62 is pressed for the long time or pressed continuously (NO at S112), the CPU 41 selects the next character as the character to be displayed after the input set character string. The CPU 41 then advances to the processing at S115. Note that in the case where the button is pressed for the long time, for as long as the button is being pressed, the CPU 41 selects, as the character to be displayed after the input set character string, the next character among the characters that are assigned to the button, cycling through the characters in alphabetical order and switching the selected character at specified intervals (for example, intervals of approximately one second).

At S115, the CPU 41 performs determination processing that determines whether or not the next character that has been selected as the character to be displayed after the input set character string is a character that can be input as the character after the input set character string. In other words, the CPU 41 performs determination processing that determines whether or not a candidate character string is stored in the candidate character string file 51 whose first portion matches a character string that is formed by appending the selected next character to the input set character string.

In a case where it is determined that the next character that has been selected as the character to be displayed after the input set character string is a character that can be input as the character after the input set character string, that is, in a case where it is determined that a candidate character string whose first portion matches the character string that is formed by appending the selected next character to the input set character string is stored in the candidate character string file 51 (YES at S115), the CPU 41 advances to the processing at S116.

At S116, the CPU 41 displays in ordinary form the character that has been selected as the character to be displayed after the input set character string. In other words, the CPU 41 displays the character as the last input character in the input character display portion 66 on the search term input screen 61, using the font and the color that are used for an ordinary display. The CPU 41 then advances to the processing at S118.

On the other hand, in a case where it is determined that the next character that has been selected as the character to be displayed after the input set character string is a character that cannot be input as the character after the input set character string, that is, in a case where it is determined that a candidate character string whose first portion matches the character string that is formed by appending the selected next character to the input set character string is not stored in the candidate character string file 51 (NO at S115), the CPU 41 advances to the processing at S117.

At S117, the CPU 41 displays, in a form that is different from the ordinary form, the character that has been selected as the character to be displayed after the input set character string. In other words, the CPU 41 displays the character as the last input character in the input character display portion 66 on the search term input screen 61, using a font and a color that are different from those that are used for an ordinary display. The CPU 41 then advances to the processing at S118.

At S118, the CPU 41 performs determination processing that determines whether or not the last input character has been set, that is, whether or not the user's finger has been removed from the button within a specified time after the last input character is displayed (for example, within one second). In a case where it is determined that the last input character has not been set, that is, in a case where it is determined that the button has been pressed continuously for longer than the specified time after the last input character is displayed (NO at S118), the CPU 41 selects the next character that is assigned to button, then once again performs the processing that begins at S115.

Next, an example of a case in which the "PQRS" button is pressed for the long time while "TE" is being displayed in the input character display portion 66 as the input set character string will be explained based on the FIG. 9B and on FIG. 10. Note that a candidate character string whose first portion matches the character string "TER" is not stored in the candidate character string file 51. As shown in the FIG. 9B, in the case where the "PQRS" button is pressed for the long time, the CPU 41 displays in order the characters that can follow "TE", the input set character string, such that "P" and then "Q" are each displayed for a specified time, using the font and the color that are used for the ordinary display.

Figure 9B:
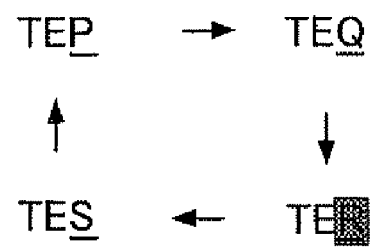
Figures 10, 11:
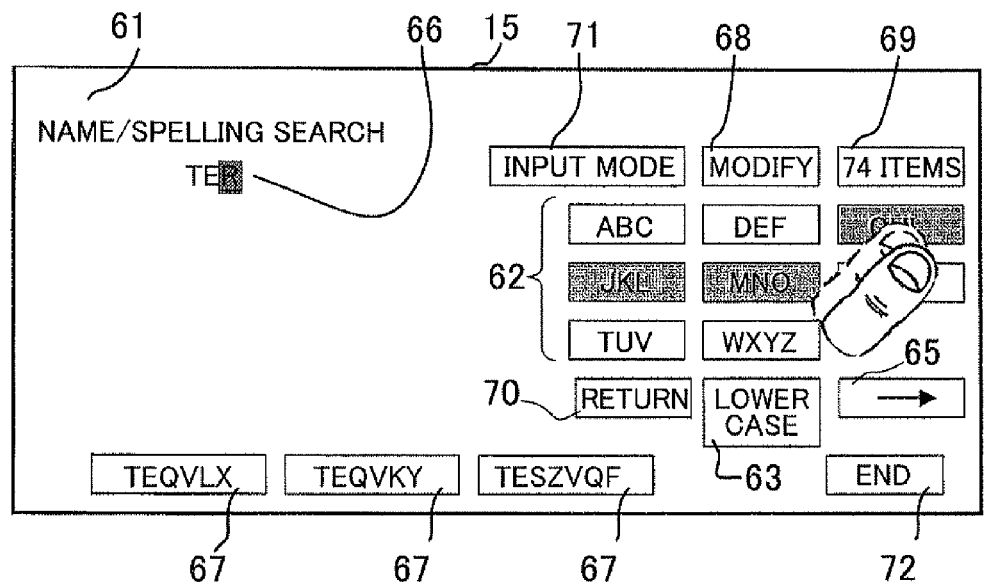
FIG. 10 is a figure that shows an example in which a character "R" that cannot be input is displayed in input character display portion when the "PQRS" button on the search term input screen is pressed for a long time, according to the first embodiment of the present invention.
FIG. 11 is a figure that shows a different example of candidates for output that are selected in a case where the "PQRS" button is pressed after the character string "TE" has been input, according to the first embodiment of the present invention.

Then, as shown in the FIG. 9B and in FIG. 10, the CPU 41 displays "R" as the last input character after the input set character string "TE", using a font and a color that are different, from those that are used for the ordinary display. Next, as shown in the FIG. 9B, the CPU 41 displays "S" as the last input character after the input set character string "TE", using the font and the color that are used for the ordinary display. In a case where the button continues to be pressed for a longer time (NO at S118), the CPU 41 repeatedly cycles through the displaying of the characters "P", "Q", "R", and "S" as the last input character.

On the other hand, in a case where it is determined that the last input character has been set, that is, in a case where it is determined that the user's finger has been removed from the button within a specified time after the last input character is displayed (YES at S118), the CPU 41 displays the last input character that was being displayed when the user's finger was removed from the button. The CPU 41 then terminates the processing. However, in a case where the last input character that was being displayed when the user's finger was removed from the button is a character that cannot be input as the next character after the input set character string, the CPU 41 selects the next character after that and displays it as the last input character in the input character display portion 66. Then the CPU 41 terminates the processing.

Note that in the case where the last input character that was being displayed when the user's finger was removed from the button is a character that cannot be input as the next character after the input set, character string, the CPU 41 may also select the preceding character and display it as the last input character in the input character display portion 66 before terminating the processing. In addition, in the case where the last input character that was being displayed when the user's finger was removed from the button is a character that cannot be input as the next character after the input set character string, the CPU 41 may also select the character that occurs most frequently in the candidate character strings and display it as the last input character in the input character display portion 66 before terminating the processing.

As has been explained in detail above, in the case where one of the buttons in the input keys 62 is pressed, the CPU 41 of the navigation device 1 according to the present embodiment sequentially reads from the candidate character string file 51 and stores in the RAM 42 the candidate character strings whose first portions match the character strings, each of which is created by appending a corresponding one of the characters that can be input through the pressed button to the input set character string whose input has been set, and which is displayed in the input character display portion 66. Furthermore, for each of the candidate character strings that it reads, the CPU 41 obtains the display priority value for the candidate character string in such a manner that the display priority value increases with decrease in the number of times that the button among the input keys 62 is required to be pressed to display the next character after the last input character. The CPU 41 then selects the predetermined number N (for example, three) of the candidate character strings in order starting with the highest display priority value and displays the candidate character strings in the candidate character string display portions 67 on the search term input screen 61.

Thus the user does not have to switch the last input character by once again pressing the pressed button in the input keys 62. Instead, by pressing the candidate character string display portion 67, it is possible for the user to display in the input character display portion 66 the candidate character string whose first portion matches the character string that is created by appending, to the input set character string, the other character that can be displayed by pressing the pressed button a specified number of times.

In addition, the display priority rankings of the candidate character strings are set in such a manner that the highest priority values are assigned to the candidate character strings whose first portions match the character string that includes the last input character that is displayed by the pressed button in the input keys 62. This makes it possible for the user to display in the input character display portion 66 one of the candidate character strings whose first portions match the character string that includes the last input character, simply by pressing the one of the candidate character string display portions 67 in which the desired candidate character string is displayed.

Furthermore, the display priority rankings of the candidate character strings can be set in such a manner that priority is given to the candidate character strings in which the next character, after the last input character that is displayed by the pressed button in the input keys 62, can be input by pressing the pressed button the least number of times. This makes it possible for the user to display in the input character display portion 66 one of the candidate character strings whose first portions match the character string that includes the last input character that is displayed the next time that the pressed button in the input keys 62 is pressed, simply by pressing the one of the candidate character string display portions 67 in which the desired candidate character string is displayed.

Moreover, in the case where one of the buttons in the input keys 62 is pressed for the short time, only the characters that can be input as the next character after the input set character string are displayed by the CPU 41 as the last input character in the input character display portion 66 of the search term input screen 61, using the font and the color that are used for the ordinary display. This makes it possible for the user, by pressing one of the buttons in the input keys 62 for the short time, to efficiently input a character that is included in at least one candidate character string whose first portion matches the character string that includes the last input character.

In addition, in the case where one of the buttons in the input keys 62 is pressed for the long time, a character that can be input as the next character after the input set character string is displayed by the CPU 41 as the last input character in the input character display portion 66 of the search term input screen 61, using the font and the color that are used for the ordinary display. Further, a character that cannot be input as the next character after the input set character string is displayed by the CPU 41 as the last input character in the input character display portion 66 of the search term input screen 61, using a font and a color that are different from those that are used for the ordinary display.

Thus, even if the button is pressed for the long time or pressed continuously, it is easy for the user, by looking at the last input character in the cyclically switched display, to check whether or not there is a candidate character string whose first portion matches the character string that includes the currently displayed character. This makes it possible for the user to accurately input a character that is included in at least one candidate character string whose first portion matches the character string that includes the last input character.

Note that the present invention is not limited to the embodiment that is described above, and it is obvious that various types of improvements and modifications can be made to the present invention within the scope of the claims.

For example, at S17, the CPU 41 may read from the candidate character string file 51 the priority values for all of the candidate character strings that were stored in the RAM 42 as the candidates for output, then identify the candidate character string that has the highest priority value. The CPU 41 may then read from the RAM 42 the display priority value for the candidate character string that has the highest priority value, set the display priority value such that it is the highest display priority value, and store it in the RAM 42. The CPU 41 may then sort the candidate character strings in descending order, starting with the candidate character string that has the highest display priority value.

Next, based on FIG. 11, an example of the candidate character strings that are displayed in the candidate character string display portions 67 on the search term input screen 61 will be explained, using a case in which the input set character string displayed in the input character display portion 66 on the search term input screen 61 is "TE", and the last input character is one of "P", "Q", "R", and "S", that is, the "PQRS" button in the input keys 62 has been pressed.

Note that the display priority value for each of the candidate character strings is obtained by adding one of "8000", "4000", "2000", and "zero" to the priority value for the candidate character string, according to whether the number of times that the "PQRS" button is required to be pressed to display the next character in the candidate character string, after the matching first portion and after the last input character, is zero times, one time, two times, or three times, respectively. In addition, the display priority value for the candidate character string with the highest priority value is obtained by adding "10000" to the priority value for the candidate character string.

For example, in a case where the input character "P" is input by pressing the "PQRS" button in the input keys 62 one time, as shown in the first row in FIG. 11, the CPU reads "TEPCE", "TEQUILA", "TEQVKY", "TEQVLX", "TESZMLK", and "TESZVQF" in that order as the candidate character strings from the candidate character string file 51. The display priority values for those candidate character strings are "8219", "4188", "4160", "4180", "208", and "10253", respectively.

The CPU 41 sorts the candidate character strings in descending order by the display priority values, that is, "TESZVQF", "TEPCE", "TEQUILA", "TEQVLX", and so on, then stores them in the RAM 42 as the candidates for output. Next, the CPU 41 displays "TEP" in the input character display portion 66 on the search term input screen 61 and also selects "TESZVQF", "TEPCE", and "TEQUILA", the three candidate character strings with the highest display priority values, and displays them in the candidate character string display portions 67.

Furthermore, in a case where the input character "S", for example, is input by pressing the "PQRS" button in the input keys 62 four times, as shown in the fourth row in FIG. 11, the CPU 41 reads "TEPCE", "TEQUILA", "TEQVKY", "TEQVLX", "TESZMLK", and "TESZVQF" in that order as the candidate character strings from the candidate character string file 51. The display priority values for those candidate character strings are "4219", "2188", "2160", "2180", "8208", and "10253", respectively.

The CPU 41 sorts the candidate character strings in descending order by the display priority values, that is, "TESZVQF", "TESZMLK", "TEPCE", and so on, then stores them in the RAM 42 as the candidates for output. Next, the CPU 41 displays "TES" in the input character display portion 66 on the search term input screen 61 and also selects "TESZVQF", "TESZMLK", and "TEPCE", the three candidate character strings with the highest display priority values, and displays them in the candidate character string display portions 67.

Thus the user does not have to switch the last input character by once again pressing the pressed button in the input keys 62. Instead, by pressing the candidate character string display portion 67 that is displaying the candidate character string with the highest priority value among the candidate character strings whose first portions match the character strings that are created by appending, to the input set character string, the other characters that can be displayed by pressing the pressed button specified numbers of times, it is possible for the user to display in the input character display portion 66 the candidate character string with the highest priority value.

What is claimed is:

1. A location search device comprising:
   a character string storage portion that stores a plurality of search object character strings;
   a character input portion that includes a plurality of buttons;
   an input character display portion in which a character input through the character input portion is displayed, wherein when one of the plurality of buttons is repeatedly pressed or pressed continuously for a given time or longer, a plurality of characters assigned in advance to the one button is displayed in the input character display portion in a predetermined cyclic sequence; when one of the plurality of buttons is pressed, and then, another of the plurality of buttons is pressed, the character displayed in the input character display portion immediately prior to pressing of the other button is set as an input set character whose input has been set; and when the character is input through the character input portion following the input set character, a character string is input;
   an input candidate character string acquisition portion that acquires the search object character string that partially matches the character string input through the character input portion, as an input candidate character string, from the character string storage portion; and
   an input candidate character string display portion in which the input candidate character string acquired by the input candidate character string acquisition portion is assigned to a character string button through which the input candidate character string is input, and the input candidate character string assigned to the character string button is displayed,
   wherein the input candidate character string acquisition portion creates a plurality of compound character strings by combining the input set character string whose input has been set through the character input portion with the plurality of characters assigned in advance to the button that is pressed next, and the input candidate character string acquisition portion acquires the search object character strings that partially match the respective compound character strings, as the input candidate character strings, from the character string storage portion.

2. The location search device according to claim 1, further comprising:
   a priority ranking setting portion that sets a priority ranking of each of the input candidate character strings acquired by the input candidate character string acquisition portion, based on priority values assigned in advance to the input candidate character strings,
   wherein the priority ranking setting portion increases the priority ranking of the input candidate character string that partially matches the compound character string created by combining the input set character string whose input has been set through the character input portion with the character that is currently being displayed, among the plurality of characters assigned in advance to the button that is pressed next.

3. The location search device according to claim 2, wherein
   the priority ranking setting portion sets a priority ranking of each of the characters assigned in advance to the button that is pressed next, in such a manner that the priority ranking of the character increases with decrease in the number of times that the button is required to be pressed to display the character after the currently displayed character; and
   the priority ranking setting portion sets the priority ranking of each of the input candidate character strings acquired by the input candidate character string acquisition portion, in such a manner that the priority ranking of the input candidate character string increases with increase in the priority ranking of the character which is assigned in advance to the button that is pressed next, and which corresponds to the input candidate character string.

4. The location search device according to claim 1, wherein
   the search object character string whose first portion matches the input set character string is acquired as the input candidate character string.

5. A location search method comprising:
   performing a character input process, wherein when one of a plurality of buttons in a character input portion is repeatedly pressed or pressed continuously for a given time or longer, a plurality of characters assigned in advance to the one button is displayed in an input character display portion in a predetermined cyclic sequence; when one of the plurality of buttons is pressed, and then, another of the plurality of buttons is pressed, the character displayed in the input character display portion immediately prior to pressing of the other button is set as an input set character whose input has been set; and when the character is input through the character input portion following the input set character, a character string is input;
   acquiring a search object character string that partially matches the input character string, as an input candidate character string, from a character string storage portion that stores a plurality of search object character strings; and
   assigning the input candidate character string to a character string button through which the input candidate character string is input, and displaying the input candidate character string assigned to the character string button; and
   creating a plurality of compound character strings by combining the input set character string whose input has been set with the plurality of characters assigned in advance to the button that is pressed next, and acquiring the search object character strings that partially match the respective compound character strings, as the input candidate character strings.

6. The location search method according to claim 5, further comprising:
setting a priority ranking of each of the input candidate character strings, based on priority values assigned in advance to the input candidate character strings; and
increasing the priority ranking of the input candidate character string that partially matches the compound character string created by combining the input set character string with the character that is currently being displayed, among the plurality of characters assigned in advance to the button that is pressed next.

7. The location search method according to claim 6, wherein
a priority ranking of each of the characters assigned in advance to the button that is pressed next is set in such a manner that the priority ranking of the character increases with decrease in the number of times that the button is required to be pressed to display the character after the currently displayed character; and
the priority ranking of each of the acquired input candidate character strings is set in such a manner that the priority ranking of the input candidate character string increases with increase in the priority ranking of the character which is assigned in advance to the button that is pressed next, and which corresponds to the input candidate character string.

8. The location search method according to claim 5, wherein
the search object character string whose first portion matches the input set character string is acquired as the input candidate character string.

9. A computer-readable medium that stores a computer-executable location search program that causes a computer to perform the location search method according to claim 5.

10. A location search device comprising:
a character string storage portion that stores a plurality of search object character strings;
a character input portion that includes a plurality of buttons;
an input character display portion in which a character input through the character input portion is displayed, wherein when one of the plurality of buttons is repeatedly pressed or pressed continuously for a given time or longer, a plurality of characters assigned in advance to the one button is displayed in the input character display portion in a predetermined cyclic sequence; when one of the plurality of buttons is pressed, and then, another of the plurality of buttons is pressed, the character displayed in the input character display portion immediately prior to pressing of the other button is set as an input set character whose input has been set; and when the character is input through the character input portion following the input set character, a character string is input;
a time measurement portion that measures a pressed time during which the button in the character input portion is pressed;
a character determination portion that determines whether at least one of the search object character strings stored in the character string storage portion partially matches the character string that includes the character to be displayed, when the button is pressed so that the plurality of characters assigned to the button is displayed in the predetermined cyclic sequence; and
an input character display control portion, wherein if the character determination portion determines that at least one of the search object character strings stored in the character string storage portion partially matches the character string that includes the character to be displayed, the input character display control portion displays the character in an ordinary form in the input character display portion, and if the character determination portion determines that none of the search object character strings stored in the character string storage portion partially matches the character string that includes the character to be displayed, the input character display control portion changes a form in which the character is displayed, in accordance with the pressed time.

11. The location search device according to claim 10, wherein
if the pressed time is less than a specified time and the character determination portion determines that none of the search object character strings stored in the character string storage portion partially matches the character string that includes the character to be displayed, the input character display control portion does not display the character in the input character display portion.

12. The location search device according to claim 11, wherein
if the pressed time is not less than the specified time and the character determination portion determines that none of the search object character strings stored in the character string storage portion partially matches the character string that includes the character to be displayed, the input character display control portion displays the character in a form that is different from a form that is used when the character determination portion determines that at least one of the search object character strings stored in the character string storage portion partially matches the character string that includes the character.

13. The location search device according to claim 12, wherein
if the character determination portion determines that none of the search object character strings stored in the character string storage portion partially matches the character string that includes the character to be displayed, the input character display control portion displays the character using, at least one of a font and a color that is different from the corresponding at least one of a font and a color that is used when the character determination portion determines that at least one of the search object character strings stored in the character string storage portion partially matches the character string that includes the character.

14. The location search device according to claim 12, wherein
if the character determination portion determines that none of the search object character strings stored in the character string storage portion partially matches the character string that includes the character that is displayed when the pressed button is released, the input character display control portion displays the character that is among the characters assigned to the released button, and that should be displayed after the character that was displayed when the button was released, as the last input character, in the input character display portion.

15. The location search device according to claim 12, wherein
if the character determination portion determines that none of the search object character strings stored in the character string storage portion partially matches the character string that includes the character that is displayed when the pressed button is released, the input character display control portion displays the character that is among the characters assigned to the released button, and that was displayed before the character that was displayed when the button was released, as the last input character, in the input character display portion.

16. The location search device according to claim 12, wherein if the character determination portion determines that none of the search object character strings stored in the character string storage portion partially matches the character string that includes the character that is displayed when the pressed button is released, the input character display control portion selects one character from among the characters assigned to the released button so that the number of the search object character strings that partially match the character string that ends with the selected character is largest among the numbers of the search object character strings that partially match the character strings that end with the characters assigned to the released button, and the input character display control portion displays the selected character as the last input character, in the character display portion.

* * * * *